June 25, 1968  M. E. GERRY  3,389,953
SOUND SYNCHRONIZED CARTRIDGE
Original Filed June 28, 1965  2 Sheets-Sheet 1

INVENTOR.
Martin E Gerry

June 25, 1968 M. E. GERRY 3,389,953
SOUND SYNCHRONIZED CARTRIDGE
Original Filed June 28, 1965 2 Sheets-Sheet 2
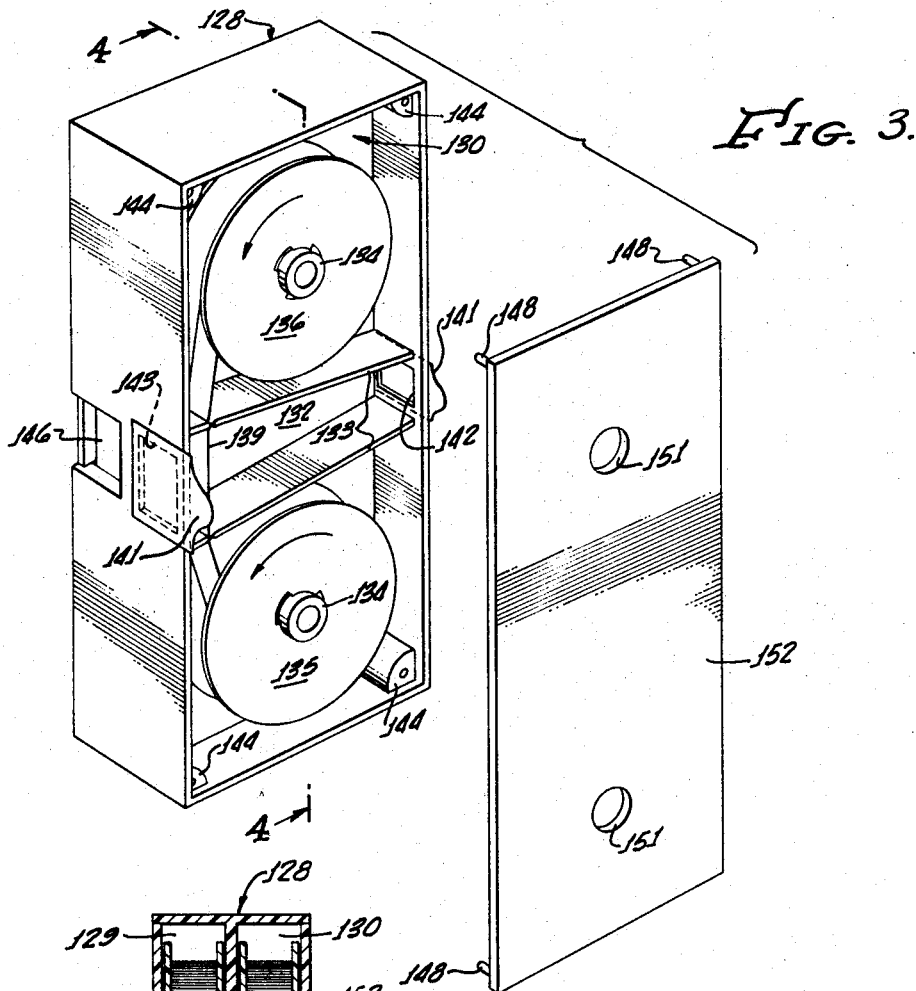
FIG. 3.
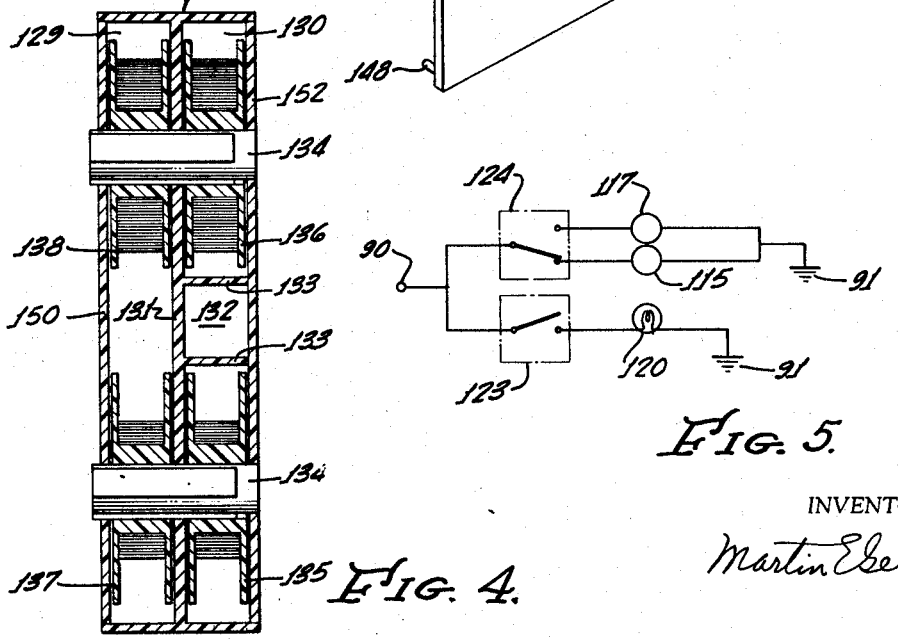
FIG. 4.
FIG. 5.
INVENTOR.
Martin E Gerry

United States Patent Office 3,389,953
Patented June 25, 1968

3,389,953
SOUND SYNCHRONIZED CARTRIDGE
Martin E. Gerry, Santa Ana, Calif., assignor of one-half to Aaron L. Sandberg, La Mirada, Calif.
Original application June 28, 1965, Ser. No. 467,223, now Patent No. 3,332,319, dated July 25, 1967. Divided and this application June 26, 1967, Ser. No. 662,227
2 Claims. (Cl. 352—78)

ABSTRACT OF THE DISCLOSURE

A rectangularly shaped film cartridge having two lengthwise extending compartments separated by a common wall. A visual film take-up spool and a sound tape take-up spool are mounted coaxially on a shaft extending through the common wall, one spool in each compartment. The visual film supply spool and the sound tape supply spool are similarly mounted on a second shaft such that the sound tape and the film move in synchronism. A tapered light channel is provided in the visual film compartment and an aperture for the admission of a sound head is provided in the tape compartment.

---

This is a divisional application of copending application Ser. No. 467,223, filed June 28, 1965 now Patent No. 3,332,319.

Objectives and advantages

Particular advantages of the present invention are that it includes a sound reproduction cartridge having two adjacent coplanar compartments, having a long reproducing or recording time, and occupying a small volume of space. One compartment retains a magnetic tape with sound track thereon, while the other compartment retains a photographic tape held therein. A further feature of the present invention is a stationary record-reproduce head mechanism mounted on a supporting plate so that the head adapts itself to and provides the proper pressure on the magnetic tape for recording or reproducing of a sound track. Further advantages are embodied in the use of a cartridge with two adjacent compartments, one compartment retaining a pair of spools with photographic motion picture film thereon, while the other compartment retains a pair of spools with magnetic tape thereon. The spools are keyed to two shafts, each shaft retaining one spool for magnetic tape and one spool for photographic film, both shafts are mounted in the cartridge walls or covers, thereby providing for synchronization of the sound track on the magnetic tape with the visual information on the photographic motion picture film. An advantage of this motion picture cartridge is its simplicity of construction, permitting photographic development of the film to take place while the film is in its compartment and on the spools, and reproducing synchronized sound and motion pictures by inserting this cartridge in a motion picture projector of very simple and inexpensive construction. Another advantage of the motion picture cartridge is that it may be used in a motion picture camera as well as in a motion picture projector, never requiring the removal of sound track tape or film from the cartridge when interchanging its use between the motion picture camera and the motion picture projector. A further advantage of this cartridge is that its parts may be fabricated inexpensively by injection plastic molding process, and the tape and film rapidly inserted therein. A further embodiment and advantage of this invention is that a single pair of spools retaining motion picture film with a magnetic coating striped continuously along one edge of the film for the entire length of the film, and installed in a single compartment cartridge on two shafts, both shafts mounted in the walls or covers of the compartment, and having the additional advantage of even less expensive and simpler construction than the dual compartment cartridge. Further advantages in connection with either of the motion picture cartridges are realized because one motor is used to drive the sound and motion picture film and tape, while another motor is used for rewinding, thereby providing for simplicity of construction of the motion picture projection machine as well as for the sound recording motion picture camera. Still further advantages of the motion picture cartridges are that threading of the film and/or tape is eliminated in both the camera and the projector, the use of sprocket holes in the film for transporting the film are eliminated avoiding tearing of film due to tension of sprockets in sprocket holes, or due to misalignment of sprocket holes with respect to the sprocket wheels, which also results in lower cost of motion picture film production.

Drawings

A complete understanding of the invention may be obtained by a study of the following detailed description taken in conjunction with the accompanying drawings in which:

FIGURE 3 is a perspective view of the same two-compartment sound synchronized motion picture cartridge as in FIGURE 2, but displaying the compartment in which the spools retaining the motion picture film are mounted, the same two keyed shafts, the projection light trough, the cover for this compartment, and the opaque light blocking tabs;

FIGURE 4 is a view in cross-section taken along line 4—4 of FIGURE 3. All parts, excepting the two keyed shafts, are shown in cross-section; and FIGURE 5 is a schematic showing the projection lamp, the drive motor, and the rewind motor electrical control circuit of the motion picture projector.

Motion picture camera, projector, and cartridge

Figures 1, 2:
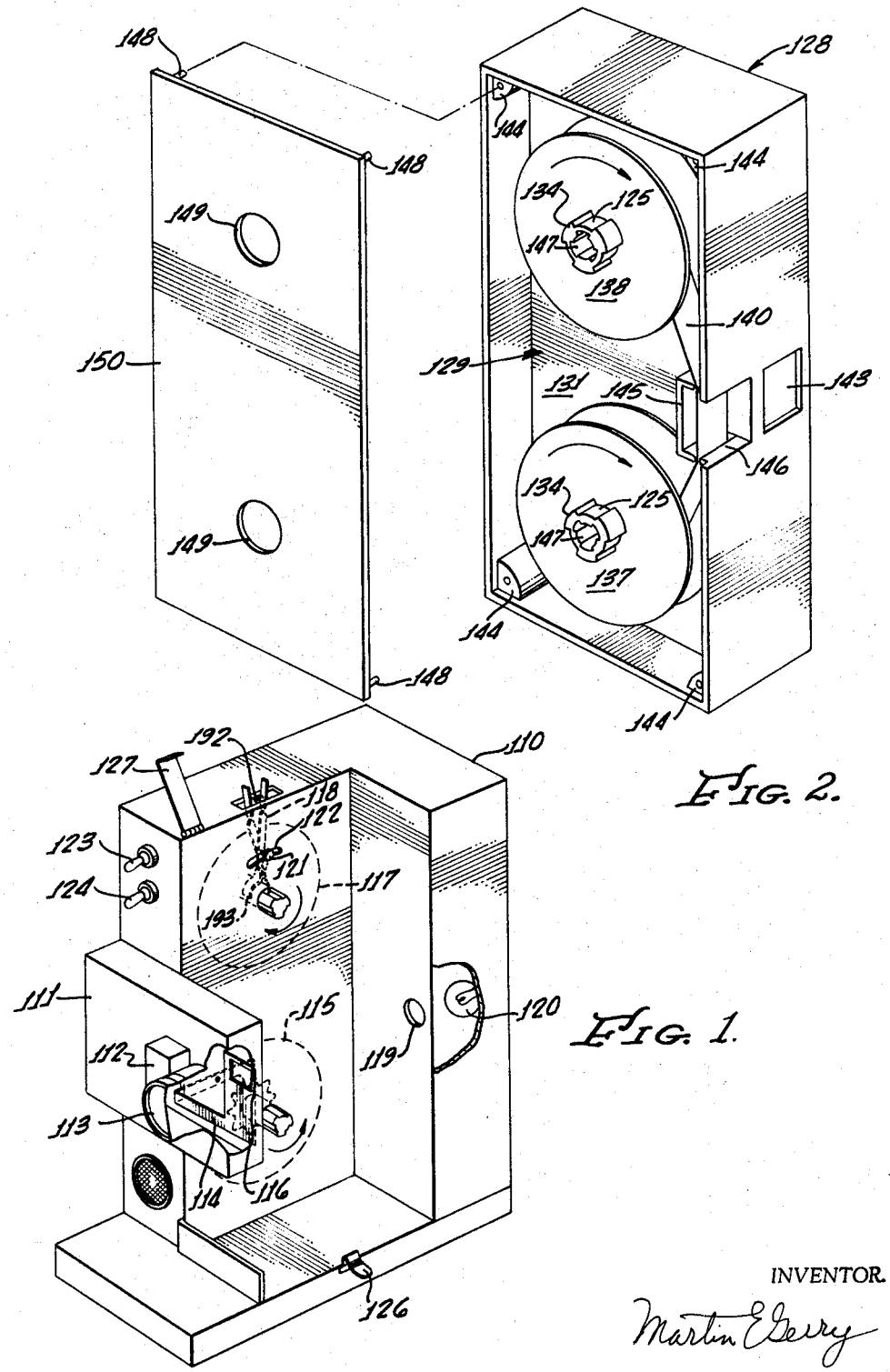
FIGURE 1 is a perspective view, partially in cross-section, of a sound synchronized motion picture projector used in conjunction with a sound track synchronized motion picture cartridge.
FIGURE 2 is a perspective view of a two-compartment sound synchronized motion picture cartridge, displaying the compartment in which the spools retaining the sound track tape are mounted on outer and inner keyed shafts, also used for coupling to a projector or a camera, and also displaying the compartment cover.

Referring to FIGURES 1, 2, 3, 4, and 5, a simple motion picture projector case 110 has mounted therein an optical and sound reproduction assembly 111, which retains a sound reproduction head 112 and a lens projection assembly 13. Said lens projection assembly has a shutter mechanism 114 activated by a sprocket wheel engaging and cooperating with the pawl shaped end of the shutter extension, causing reciprocal motion of shutter mechanism 114, opening and closing shutter 116 at a specific rate proportion to the rate of sprocket engagements per unit time. The shaft of rewind motor 117 is keyed in an identical manner as the shaft of the reproduce motor 115, and both reproduce and rewind motors are mounted mechanically internal to case 110 with shafts of these motors protruding external to said case 110 for engagement with a cartridge to be hereinafter described. A motion picture frame registration adjust mechanism 118, having pivot pin 121 and pivot slot 122, grips the rewind motor shaft 117 when said mechanism 118 levers are manually compressed thereby compressing spring 192, the claws 193 gripping the shaft of motor 117 thereby enabling manual positioning of rewind motor shaft until a frame of motion picture film 139 of cartridge 128 in which motion picture film 139 is located, is in perfect registration with the shutter aperture. Projection lamp assembly 120, mounted inside projector case 110, is electrically energized from power means 90 and 91 through cooperating contacts of switch 123, and when tabs 141 are removed by manually pulling apart the adhesively backed tabs from the surfaces of cartridge case 128, a light beam is projected through aperture 119, aperture 132, film 139, aperture 143, aperture in periodically opened shutter 116 and lens assembly 113, on to a projection screen, thereby projecting the visual information from film 139 stored on spools 135 and 136 which provides a sequence of motion picture frames at a predetermined rate corresponding to number of shutter openings per unit time. Spools 137 and 138 are retained on tubular shafts 134 mechanically, and have keyways 147 in their inner surfaces, and keyways 125 on their outer surfaces. The inner surface keyways 147 are engaged by and cooperate with shafts of motors 117 and 115, said shafts each being inserted into the inner surface keyways 147, said shafts being appropriately keyed, when cartridge 128 is inserted into projector case 110. Cartridge retainer snaps 126 and 127 apply pressure against cover 152 and hold cartridge 128 securely, after cartridge 128 is inserted into projector case 110. In the motion picture compartment 130, motion picture film 139 wound on spools 135 and 136 passes through slits in panels 133 of trough 132, substantially at right angles to panels 133 in front of and parallel to aperture 143, when both spools are driven by shaft of motor 115, or for rewinding of film in the opposite direction when driven by shaft of motor 117. Cover 152 has pins 148 and apertures 151. Pins 148 fit into holes in cover retainer inserts 144 and are held therein due to surface friction between outer surfaces of pins 148 and inner surfaces of holes in retainer inserts 144. Each of the ends of shafts 134 extending from compartment 130 into apertures 151, are flush with the outer surface of cover 152 when cover 152 covers compartment 130. In the sound track compartment 129, magnetic tape 140 is retained on spools 137 and 138 which are mounted on the same two shafts 134 extending through apertures in common wall 131, in a manner similar to the mounting of spools 135 and 136.

Spool 137 rotatable on the same axis as spool 135, and spool 138 is rotatable on the same axis as spool 136. All spools have keyways which fit and cooperate with outer keyed shafts 134. Common wall 131 separates compartments 129 and 130. Spools 137 and 138 transport magnetic tape 140 through slots in reproduce head backstop 145, which supports said tape 140 when magnetic head 112 nesting in recess 146 is cooperating with magnetically coated surface of tape 140 which is being transported within compartment 129 past aperture 146 to reproduce sound from a sound track on tape 140 via a reproduce circuit. Cover 150 has apertures 149 and pins 148 and is secured to case of cartridge 128 by friction between surfaces of pins 148 and holes in inserts 144, covering compartment 129. The ends of shafts 134 slightly extend through the apertures 149 to assure accessibility of motor drive shafts into inner keyways of cartridge spool shafts. Spools 138 and 136 are mounted on one shaft and spools 137 and 135 are mounted on another shaft, and said spools being keyed to said shafts, the sound track tape is mechanically synchronized with the motion picture film. Switch 124 is a two position switch. While switch elements 124 are in their normally cooperating position, where the movable contact cooperates with one of the stationary contacts, power is applied from power means 90 and 91 to reproduce drive motor 115, and when movable contact of switch 124 cooperates with the other stationary contact in the off-normal position of switch 124, power is applied from power means 90 and 91 to rewind motor 117, thereby rewinding motion picture film and sound track tape simultaneously.

A motion picture projector with a combination sound track and motion picture film tape has been described. However, it is obvious that the identical cartridge 128 could be utilized in a motion picture camera which has a sound track recording capability. In this instance, the camera would require only one drive motor 115, and would not require projection lamp 120 and aperture 119. Power to the camera would be provided from batteries in lieu of power means 90 and 91.

The photographic film cartridge 128 may be developed while it is in its compartment 130 by permitting the developer fluids to pass through apertures 142 and 143 while a motor drive mechanism (not shown) engages with shafts 134 driving one shaft and then the other shaft alternately for even exposure of film to the developer solution.

Although a cartridge with two sets of spools is specified hereinabove, it is evident that only one pair of spools retaining photographic film of larger width than the width of the film 139, stripped along one edge of the film over its entire length with a magnetic recording material for providing a sound track simultaneously with photographic motion pictures, may be used in a cartridge in conjunction with either a motion picture camera or a motion picture projector. The sound track may also be separately applied by a motion picture projector using a recording circuit (not shown), by re-running the developed motion picture film with magnetic coating on its edge through the projector. It is also obvious that the sound track may be optically applied when used in a motion picture camera, in which case the magnetic coating strip would not be applied to the photographic motion picture film, and the recording head in the camera would be an audio to optical transducer. It is also obvious that the sound track may be mechanically applied by using a recording head with a stylus which would emboss or engrave a mechanical sound track on the surface of the photographic film near the edge of the photographic film.

*Television camera, transmitter, and cartridge*

Although conventional motion picture cameras and projectors were described, it is obvious that the combination sound track and motion picture cartridge with a single magnetic or photographic film strip may be used in a television camera for recording sound and video information, or in a television transmitter for playing said sound and video information into a conventional television receiver. The circuitry involved in connection with the television camera is conventional for the sound track as above described, but for recording video information, an electronic scanning tube with a lens system and related scanning circuitry would be used as well as conventional means for storing the scanned information on the magnetic tape. Electronic scanning may also be replaced by a more convenient mechanical scanning system. Alternatively, photographic film may be used for audio and video information storage and retrieval. Inasmuch as the sound and motion picture cartridges comprise embodiments of this invention, the details of the video camera and the video transmitter using this group of cartridges are not given.

I claim:

1. In a motion picture apparatus of the class having a double compartment cartridge wherein a first compartment retains a pair of spools bearing visual information tape and having a tapered trough for communicating a diverging light beam and wherein a second compartment retains another pair of spools bearing sound tape and wherein each spool bearing visual information is synchronized with its corresponding spool bearing sound tape so that said synchronization is accomplished solely by mechanical coupling of one of said visual information spools with one of said sound tape spools, a cartridge comprising, a cartridge case with two covers covering said first and said second compartments, a separator panel forming a common wall between said first and second compartment, said first compartment having two separators orthogonal to said common wall and forming a tapered trough therein, one end of said trough having a large aperture and the other end of said trough having a small aperture for communicating light therethrough, a slot in each of the said two separators near the said large aperture for guiding said visual information tape therethrough, removable tabs covering said large and small apertures, two tubular shafts with keyed internal and external surfaces extending through apertures in said common wall, each said tubular shaft extending through each of two apertures in said two covers, and each of said pair of spools bearing said visual information tape of sprocketless-guide-hole construction mounted on each of said two tubular shafts in said first compartment and each of said another pair of spools mounted on each of said two tubular shafts in said second compartment thereby mechanically synchronizing said visual information and sound tapes with each other so that equal lengths of said tapes are simultaneously transportable upon rotation of either of said shafts.

2. The cartridge as in claim 1,
the said visual information tape being photographic motion picture film, and
the said sound tape being magnetic tape.

References Cited
UNITED STATES PATENTS

| | | | |
|---|---|---|---|
| 1,450,555 | 4/1923 | Lepine | 352—78 |
| 2,029,415 | 2/1936 | Dennis | 352—78 |
| 2,901,939 | 9/1959 | Van Osch | 352—22 |
| 3,141,374 | 7/1964 | Berry | 88—28 |
| 3,212,837 | 10/1965 | Beyer | 352—27 |
| 3,256,775 | 6/1966 | Hall | 88—28 |

FOREIGN PATENTS 1,124,348  2/1962  Germany.

NORTON ANSHER, *Primary Examiner.*

M. H. HAYES, *Assistant Examiner.*